US012190005B2

(12) United States Patent
Nakagawa

(10) Patent No.: US 12,190,005 B2
(45) Date of Patent: Jan. 7, 2025

(54) CLOUD PRINT SYSTEM, CONTROL METHOD THEREOF, INFORMATION PROCESSING APPARATUS, AND MEDIUM

(71) Applicant: CANON KABUSHIKI KAISHA, Tokyo (JP)

(72) Inventor: Masashi Nakagawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/536,949

(22) Filed: Dec. 12, 2023

(65) Prior Publication Data

US 2024/0241682 A1 Jul. 18, 2024

(30) Foreign Application Priority Data

Jan. 13, 2023 (JP) ................. 2023-004061

(51) Int. Cl.
*G06F 3/12* (2006.01)
(52) U.S. Cl.
CPC .......... *G06F 3/1287* (2013.01); *G06F 3/1204* (2013.01); *G06F 3/1228* (2013.01); *G06F 3/1236* (2013.01); *G06F 3/1239* (2013.01); *G06F 3/12* (2013.01)
(58) Field of Classification Search
USPC ...................................................... 358/1.15
See application file for complete search history.

(56) References Cited

U.S. PATENT DOCUMENTS

| 9,177,236 B2 † | 11/2015 | Tanaka |
| 11,461,064 B2 | 10/2022 | Inoue |
| 2016/0182757 A1* | 6/2016 | Yoo .................. H04M 1/72412 358/1.15 |
| 2021/0240412 A1 | 8/2021 | Saigusa |
| 2021/0306473 A1* | 9/2021 | Inouye ............... H04N 1/00307 |
| 2022/0236934 A1* | 7/2022 | Matsushima ........... G06F 3/126 |
| 2022/0391156 A1 | 12/2022 | Inoue |

FOREIGN PATENT DOCUMENTS

| JP | 2021-124791 A | 8/2021 |
| JP | 2021-170258 A | 10/2021 |

* cited by examiner
† cited by third party

*Primary Examiner* — Darryl V Dottin
(74) *Attorney, Agent, or Firm* — VENABLE LLP

(57) ABSTRACT

In a cloud print system a print job is transmitted from a client terminal to a second cloud print service via a first cloud print service. The first cloud print service, when registering the second cloud print service as a printer, obtains connection information for connecting to the second cloud print service and registers the second cloud print service as the printer in association with the connection information, and in response to a request from the client terminal, transmits the connection information to the client terminal. The client terminal accesses the second cloud print service based on the connection information and receives a service according to the second cloud print service.

12 Claims, 12 Drawing Sheets

F I G. 7A

```
Operation : Output-Device-Attribute Request
Printer-attribute-tag:
  Color-mode-supported : auto, monochrome, color
  Print-quality-supported : high , normal
  finishing-supported : 3, 20, 21, 22, 23
  ufo-tenant-url : https://tenant1.uniflowonline.com
```

F I G. 7B

```
Operation : Get-Printer-Attributes Response
Status code : successful-ok
Printer-attribute-tag:
  Color-mode-supported : auto, monochrome, color
  Print-quality-supported : high , normal
  finishing-supported : 3, 20, 21, 22, 23
  ufo-tenant-url:https://tenant1.uniflowonline.com
```

F I G. 7C

```
Operation : Output-Device-Attributes Response
Status code : successful-ok
Status Message : "Some attributes are not supported by the cloud print service,
but un-supported attribute was registered."
```

FIG. 8   800

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]%ManufacturerName
% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaa8a"     ~ 801
AUMID = "PrinterApp_aaaaaaaaaa8a!App"
Device.ExtensionDesc = "PrintApp"
MsStoreType = 2
PrinterHardwareId = "PrinterApp_devoce001"     ~ 802
```

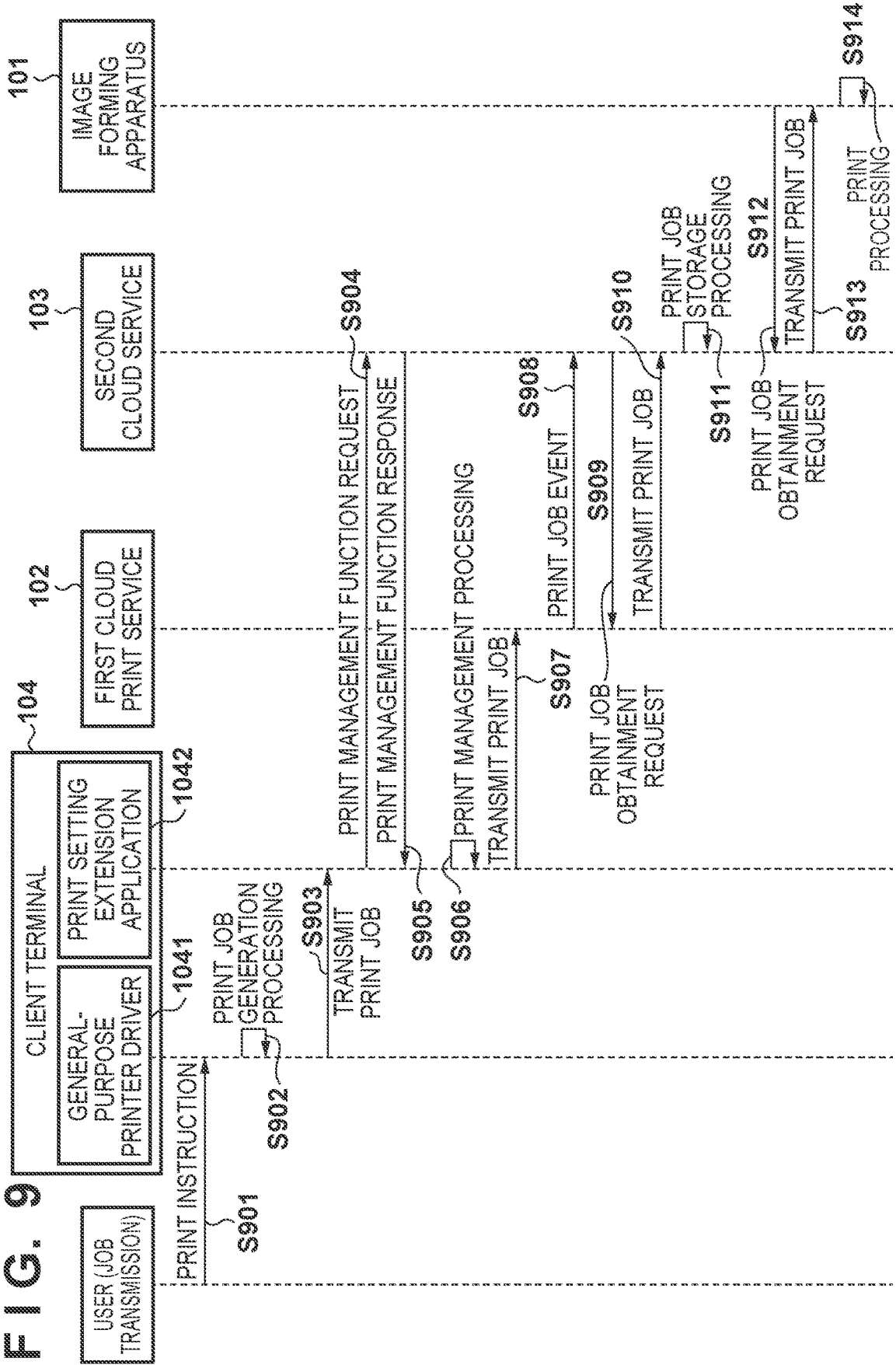

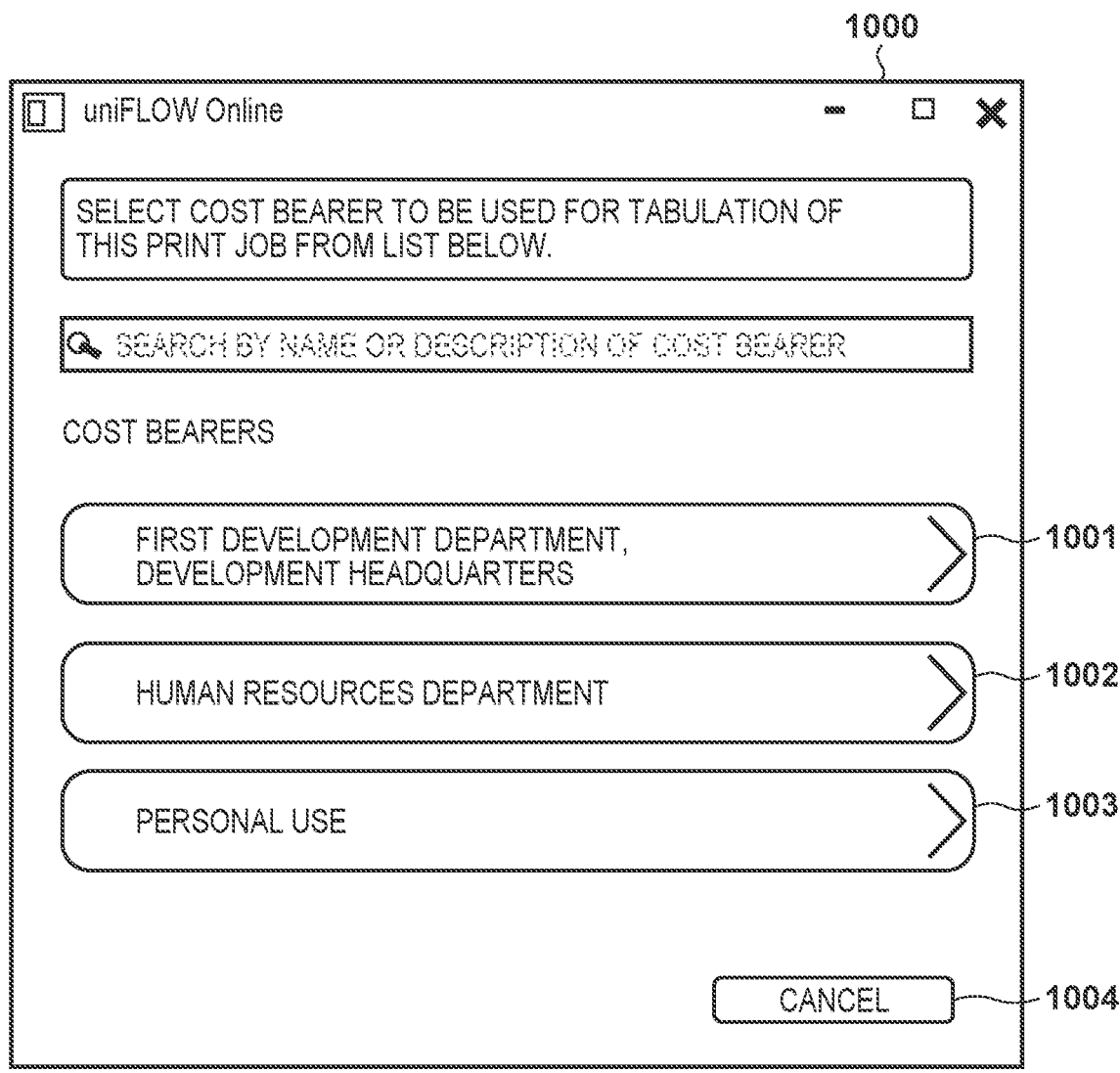

CLOUD PRINT SYSTEM, CONTROL METHOD THEREOF, INFORMATION PROCESSING APPARATUS, AND MEDIUM

BACKGROUND OF THE INVENTION

Field of the Invention

The present invention relates to a cloud print system, a control method thereof, an information processing apparatus, and a medium.

Description of the Related Art

In recent years, general-purpose printer drivers that use an industry-standard protocol, such as Internet Printing Protocol (IPP), have been considered. General-purpose printer drivers include local printer drivers, which connect directly to printers, and cloud printer drivers, which transmit print data to cloud print services.

General-purpose printer drivers can communicate with printers from a plurality of printer vendors. Therefore, by using general-purpose printer drivers, a user can transmit print data to image forming apparatuses and cloud print services without having to install vendor-specific printer drivers. The above-described general-purpose printer drivers handle print jobs to be printed by printers from various vendors and thus are limited in items and functions for which settings can be performed as print settings.

Thus, extension of print queues, which are associated with printer drivers, by use of identification information of printers, which are associated with those printer drivers, has been considered as in Japanese Patent Laid-Open No. 2021-124791. This makes it possible to realize vendor-specific print setting UIs and a print job editing function. In the following, this will be referred to as a print setting extension application.

Furthermore, servers that provide cloud print services do not discard attribute information even when unsupported attributes are included and allow the attribute information to be registered as output destination printer information as in Japanese Patent Laid-Open No. 2021-170258. Upon receiving a request for obtaining capability information of an output destination printer, a server can transmit, to the request source, capability information of the output destination printer for which the request has been made, based on registered attribute information.

Incidentally, in recent years, there have been cloud print services that can provide print management functions. To distinguish them from cloud print services to which general-purpose printer drivers are connected, they will be referred to as management function provisioning cloud print services. The print management functions are various management functions that are related to printing, such as aggregation of print result reports and enforcement of print settings that have been set by an administrator on users. In such services, an administrator of a management function provisioning cloud print service first registers an image forming apparatus in a tenant of the management function provisioning cloud print service to which they belong. The administrator sets whether to allow users that belong to the tenant to use the image forming apparatus. Here, a tenant refers to one service system that is deployed on the cloud and includes a storage region for which access is limited only to users.

For example, a Company A tenant of a management function provisioning cloud print service to be used at Company A registers employees who are working at Company A as users and registers and uses Company A's image forming apparatuses. This makes it possible for Company A's users to freely perform printing from any image forming apparatus that Company A owns when they execute printing on in-house terminals.

Some forms of printing in which such a management function provisioning cloud print service is used provide functions by performing communication with the tenant at the time of print execution. One example is a cost bearer selection function. A budget management function is provided by, at the time of printing, obtaining a "list of cost bearers", which has been set in advance in the tenant, and having a user make a selection from a pop-up screen. This makes it possible to allocate budgets for projects and departments for each instance of printing and manage the budgets. Such a function is realized by a printer driver that is provided by a vendor or an application that functions alongside that driver.

It has been described that the cloud service can output a print job that has been received from a general-purpose printer driver to a printer that has been registered in advance. However, the output destination printer need not be a physical printer apparatus, and it is possible for the output to be performed to a cloud service, such as a management function provisioning cloud print service. That is, by registering in advance a management function provisioning cloud print service as a virtual printer, a cloud print service can output a received print job to a cloud service that has been connected similarly to a physical printer apparatus. By the management function provisioning cloud print service thus coordinating with another cloud service, it is possible to realize typical cloud printing as well as provide print management functions to a cloud service.

However, in such a system as described above, a client terminal directly communicates with a physical printer when local and with a tenant of a cloud print service when in the cloud. Therefore, if the client terminal is not connected to the management function provisioning cloud print service, the client terminal cannot easily use the print management functions of the management function provisioning cloud print service that is connected to the cloud print service.

The present invention improves usability by making it easier to use, from a client terminal, print management functions that are provided by a cloud print service that is indirectly connected via a cloud print service.

SUMMARY OF THE INVENTION

The present invention includes the following configuration in order to achieve the above purpose. That is, according to one aspect of the present invention, therein provided a cloud print system in which a print job is transmitted from a client terminal to a second cloud print service via a first cloud print service, the first cloud print service comprising: at least one first memory storing at least one first program; and at least one first processor, wherein the at least one first program causes the at least one first processor to: when registering the second cloud print service as a printer, obtain connection information for connecting to the second cloud print service and register the second cloud print service as a printer in association with the connection information, and in response to a request from the client terminal, transmit the connection information to the client terminal, and the client terminal comprising: at least one second memory storing at least one second program; and at least one second processor, wherein the at least one second program causes the at least one second processor to: access the second cloud print service based on the connection information and receive a service according to the second cloud print service.

According to another aspect of the invention, there is provided an information processing apparatus operable to function as a first cloud print service that holds connection information for connecting to a second cloud print service in a cloud print system in which a print job is transmitted from a client terminal to the second cloud print service via the first cloud print service, the information processing apparatus comprising: at least one first memory storing at least one first program; and at least one first processor, wherein the at least one first program causes the at least one first processor to: when registering the second cloud print service as a printer, obtain connection information for connecting to the second cloud print service and register the second cloud print service as a printer in association with the connection information, and in response to a request from the client terminal, transmit the connection information to the client terminal.

According to the present invention, it is possible to improve usability by making it easier to use, from a client terminal, print management functions that are provided by a cloud print service that is indirectly connected via a cloud print service.

Further features of the present invention will become apparent from the following description of exemplary embodiments with reference to the attached drawings.

BRIEF DESCRIPTION OF THE DRAWINGS

FIGS. 7A, 7B, and 7C are examples of transmission and reception packets indicating a request and a response of capability information according to the present embodiment.

FIG. 8 is a diagram illustrating an example of an extension setup information file to be obtained from an online support service according to the present embodiment.

FIG. 9 is a sequence diagram illustrating an example of print processing according to the first embodiment.

FIG. 10 is a diagram illustrating an example of a screen for selecting a cost bearer that is displayed by the print setting extension application according to the present embodiment.

DESCRIPTION OF THE EMBODIMENTS

Figure 1:
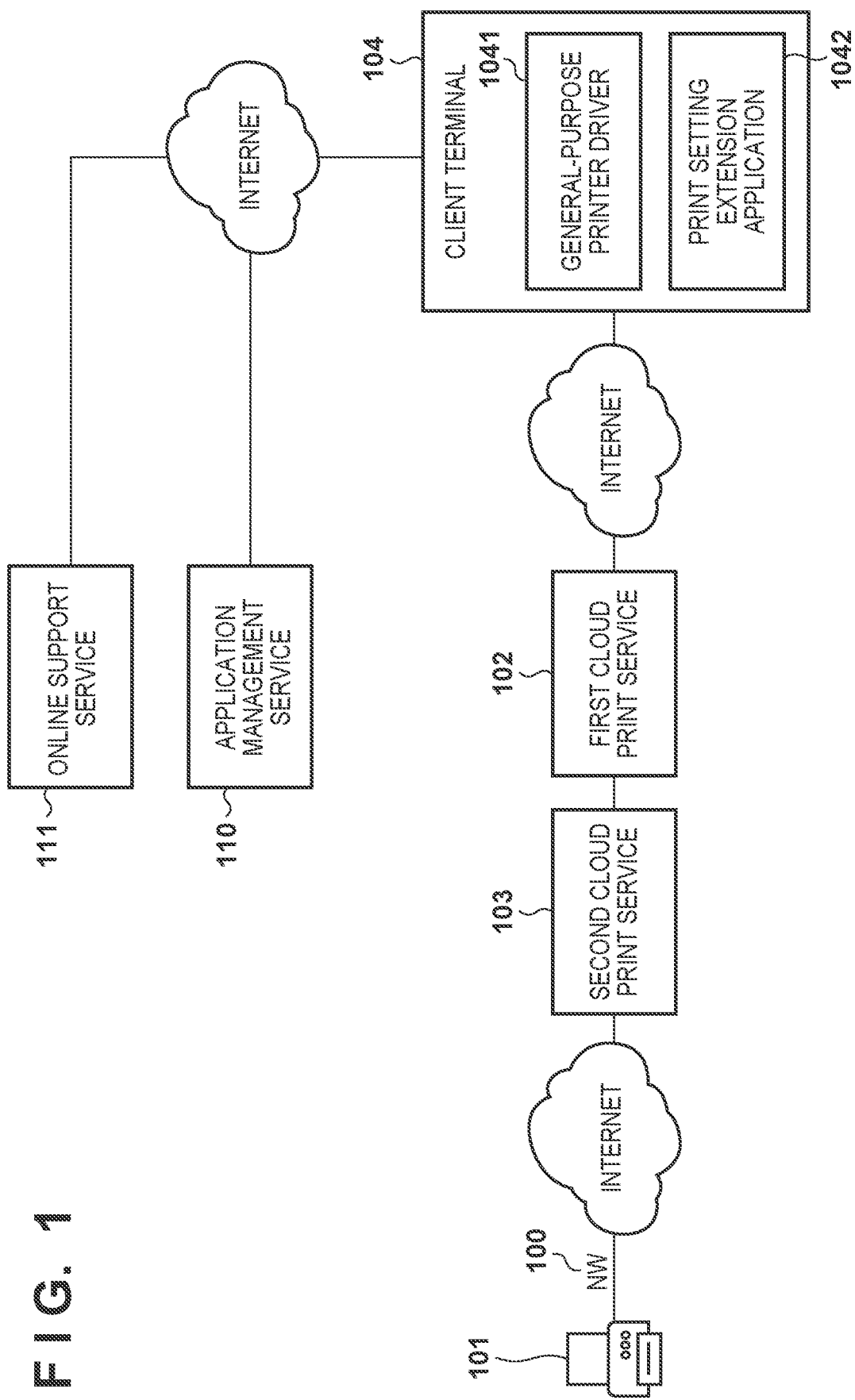
FIG. 1 is a diagram illustrating an example of a printing system according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

FIG. 1 is a block diagram illustrating a system configuration in an embodiment of the present invention. Names will be described before the drawings. A cloud print service 102 is a cloud print service that is equipped with functions according to the present embodiment. For the sake of explanation, this cloud print service will be referred to as a first cloud print service. A cloud print service 103 is a management function provisioning cloud print service that is equipped with functions according to the present embodiment. For the sake of explanation, the management function provisioning cloud print service will be referred to as a second cloud print service. CPS may be used as an abbreviation for cloud print service. Accordingly, the first cloud print service may be abbreviated as a first CPS and the second cloud print service as a second CPS. A system that includes the first CPS, the second CPS, a client terminal, and an image forming apparatus may be referred to as a cloud print system or, simply, a print system.

In FIG. 1, an image forming apparatus 101, a client terminal 104, and cloud services are directly or indirectly connected to each other in a cloud print system. The cloud services include the first cloud print service 102, the second cloud print service 103, an application management service 110, and an online support service 111. The respective services are provided by servers, which are information processing apparatus, and the servers are connected via networks 100. In the present description, the term "service" may refer to a program module to be executed by a server or its CPU to provide a corresponding service or a server that executes the program module, rather than an intangible service to be provided.

FIG. 1 illustrates one image forming apparatus 101 and one client terminal 104; however, there may be a plurality of each. The first cloud print service 102, the second cloud print service 103, the application management service 110, and the online support service 111 may each be a server system that is configured by a plurality of information processing apparatuses. Having each server system be a server system that is configured by a plurality of information processing apparatuses, it is possible to distribute the load among the plurality of information processing apparatuses. The first cloud print service 102, the second cloud print service 103, the application management service 110, and the online support service 111 may be configured virtually in one physical information processing apparatus.

Regarding the networks 100, WANs, such as the Internet, are assumed for connection to cloud services; however the networks 100 may be closed environments, such as a case where they are all in-house LANs. The networks that are illustrated as the Internet in FIG. 1 need not be a plurality of different networks and may be configured such that other components are all connected to the Internet. Accordingly, the first CPS 102 and the second CPS 103 that are directly connected in FIG. 1 may be connected to each other via the Internet.

The client terminal 104 is an information processing apparatus, such as a PC, a tablet, or a smartphone, and is a terminal to be directly operated by a user. Any application software that accords with the platform can be executed on the client terminal 104. In the present embodiment, it is assumed, in particular, that a general-purpose printer driver 1041 and a print setting extension application 1042, which is associated with that general-purpose printer driver, can be executed.

The image forming apparatus 101 is a device that actually performs printing on a printing medium, such as a paper, and is a cloud print compatible printer that converts print data that has been received via the networks 100 into image data and prints the image data. The image forming apparatus 101 can receive print data from the client terminal 104 via the first CPS 102 and the second CPS 103 as well as receive print data directly from the client terminal 104 without it going through the first CPS 102 and the second CPS 103. The image forming apparatus 101 receives print data that has been generated by the general-purpose printer driver 1041 of the client terminal 104 via the first CPS 102 and the second CPS 103. The image forming apparatus 101 also receives print data that has been generated by the general-purpose printer driver 1041 of the client terminal 104 without it going through the first CPS 102 and the second CPS 103.

The first CPS 102 receives a print instruction and print data externally, such as from the client terminal 104. The first CPS 102 then transmits the received print data to the second CPS 103. Upon receiving a print instruction from the image forming apparatus 101, the second CPS transmits the print data to the image forming apparatus 101. One of the reasons that the client terminal 104 transmits a print job to the second CPS 103 via the first CPS 102 is that it transmits the print job to the first CPS 102 using a general-purpose printer driver. If the general-purpose printer driver 1041 is installed on the client terminal, the client terminal need only select a printer that is registered in the first CPS 102 and transmit a print job, using the general-purpose printer driver 1041. Therefore, the user need not switch printer drivers for each cloud service and the trouble of installation can be eliminated, and thus, the demand is high.

The application management service 110 is a server apparatus that holds and manages various kinds of applications. The application management service 110 receives the identification information of an application and a download request from the client terminal 104 and transmits an application that has been identified based on the received identification information to the client terminal 104.

The online support service 111 is a server apparatus that provides a service that provides support online. The online support service 111 is a server apparatus for providing the client terminal 104 with an extension setup information file in which information for extending the functions of the client terminal 104 is described.

<Hardware Configuration of Image Forming Apparatus 101>

Figure 2:
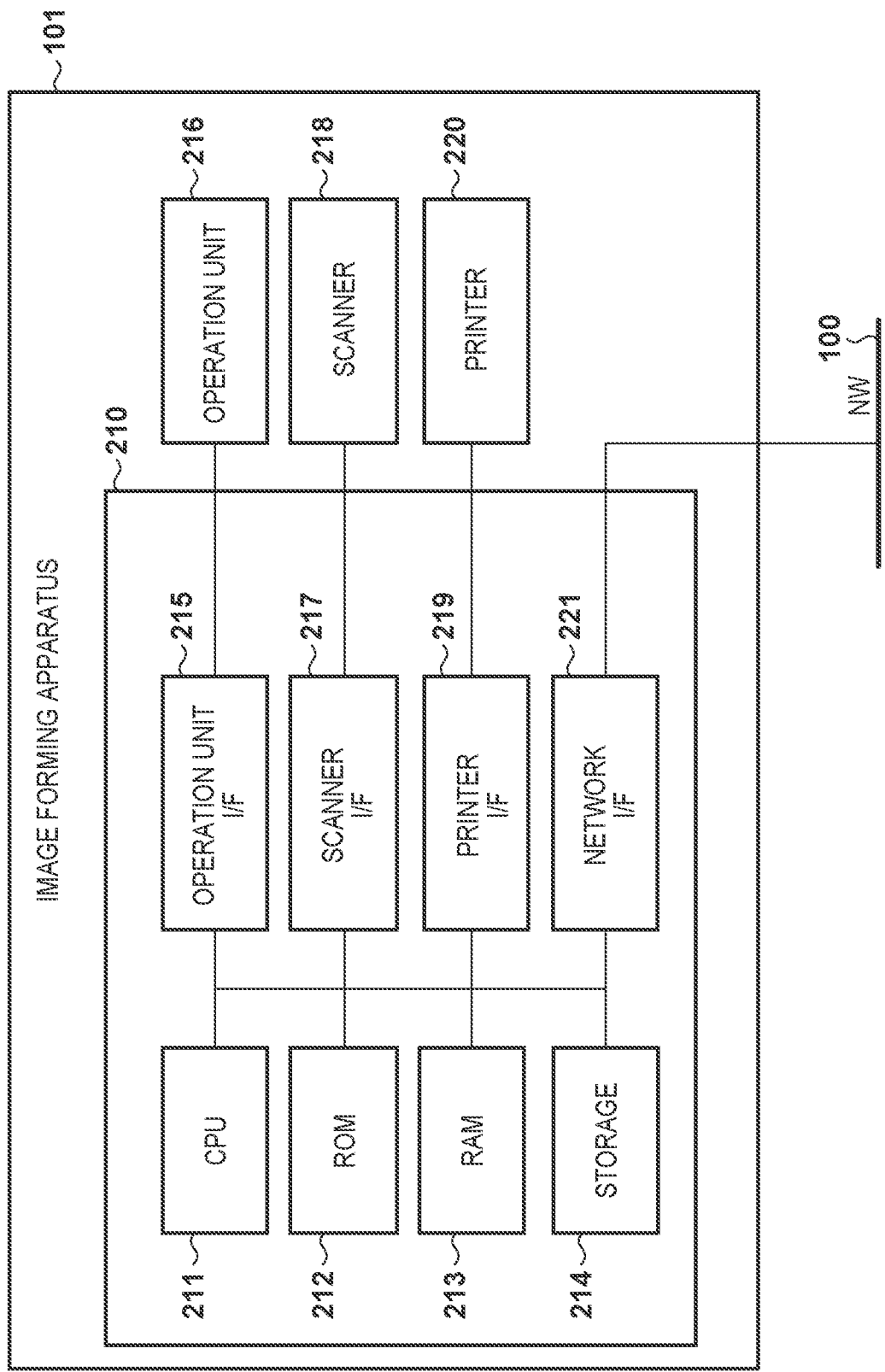
FIG. 2 is a diagram illustrating an example of a hardware configuration of a printing apparatus according to the present embodiment.

FIG. 2 is a block diagram illustrating a hardware configuration of the image forming apparatus 101. The image forming apparatus 101 includes a scanner function for reading the image on a sheet, a file transmission function by which the read image can be transmitted to an external communication apparatus, and the like. The image forming apparatus 101 also includes a printer function for printing images on sheets. It is assumed that the image forming apparatus 101 also includes a function for receiving a print job from the second CPS 103 and printing the print job.

A control unit 210 that includes a central processing unit (CPU) 111 controls the operation of the entire image forming apparatus 101. The CPU is also referred to as a processor. The CPU 211 reads out control programs that are stored in a read-only memory (ROM) 212 or a storage 214 and performs various kinds of control, such as print control and read control. The ROM 212 stores control programs that can be executed by the CPU 211. A random access memory (RAM) 213 is a main storage memory to be accessed by the CPU 111 and is used as a work area or a temporary storage region for loading various kinds of control programs. The storage 214 stores print data, image data, various kinds of programs, and various kinds of setting information. Hardware, such as the CPU 211, the ROM 212, the RAM 213 and the storage 214, thus constitutes a so-called computer.

In the image forming apparatus 101 according to the present embodiment, it is assumed that one CPU 211 executes each of the processes, which are illustrated in the sequences to be described later, using one memory (RAM 213); however, another mode may be employed. For example, each of the processes, which are illustrated in the flowcharts to be described later may be executed by cooperation of a plurality of processors, memories, and storage. A configuration may be taken so as to execute part of the processing using a hardware circuit.

A printer interface (I/F) 219 connects a printer 220 (printer engine) and the control unit 210. The printer 220 prints images on sheets that have been fed from a feed cassette (not illustrated) based on print data that has been inputted via the printer I/F 219. The method of printing may be an electrophotographic method in which toner is transferred to paper and fixed or an inkjet method in which printing is performed by ink being discharged onto paper.

A scanner I/F 217 connects a scanner 218 and the control unit 210. The scanner 218 reads a document that has been placed on a document table (not illustrated) and generates image data. The image data that has been generated by the scanner 218 is printed by the printer 220, stored in the storage 214, or transmitted to an external apparatus via a network I/F 221.

An operation unit I/F 215 connects an operation unit 216 and the control unit 210. The operation unit 216 includes a liquid crystal display unit that includes a touch panel function, various kinds of physical keys, and the like. The operation unit 216 functions as a display unit that displays information to the user and a reception unit that receives instructions from the user. The CPU 211 performs control for display of information and control for acceptance user operations in cooperation with the operation unit 216.

A network cable is connected to the network I/F 221, and communication with external apparatuses that are on the network 100 or the Internet can be executed. In the present embodiment, a case where the network I/F 221 is a communication interface that performs wired communication that conforms to Ethernet® is assumed; however, the present invention is not limited thereto. For example, the network I/F 221 may be a wireless communication interface that conforms to the IEEE 802.11 series. Both may be wireless communication interfaces. The network I/F 221 may be a communication interface that performs mobile communication, such as a 3G line, such as a CDMA; a 4G line, such as an LTE; or a 5G NR.

<Hardware Configuration of Servers and Client Terminal>

Figure 3:
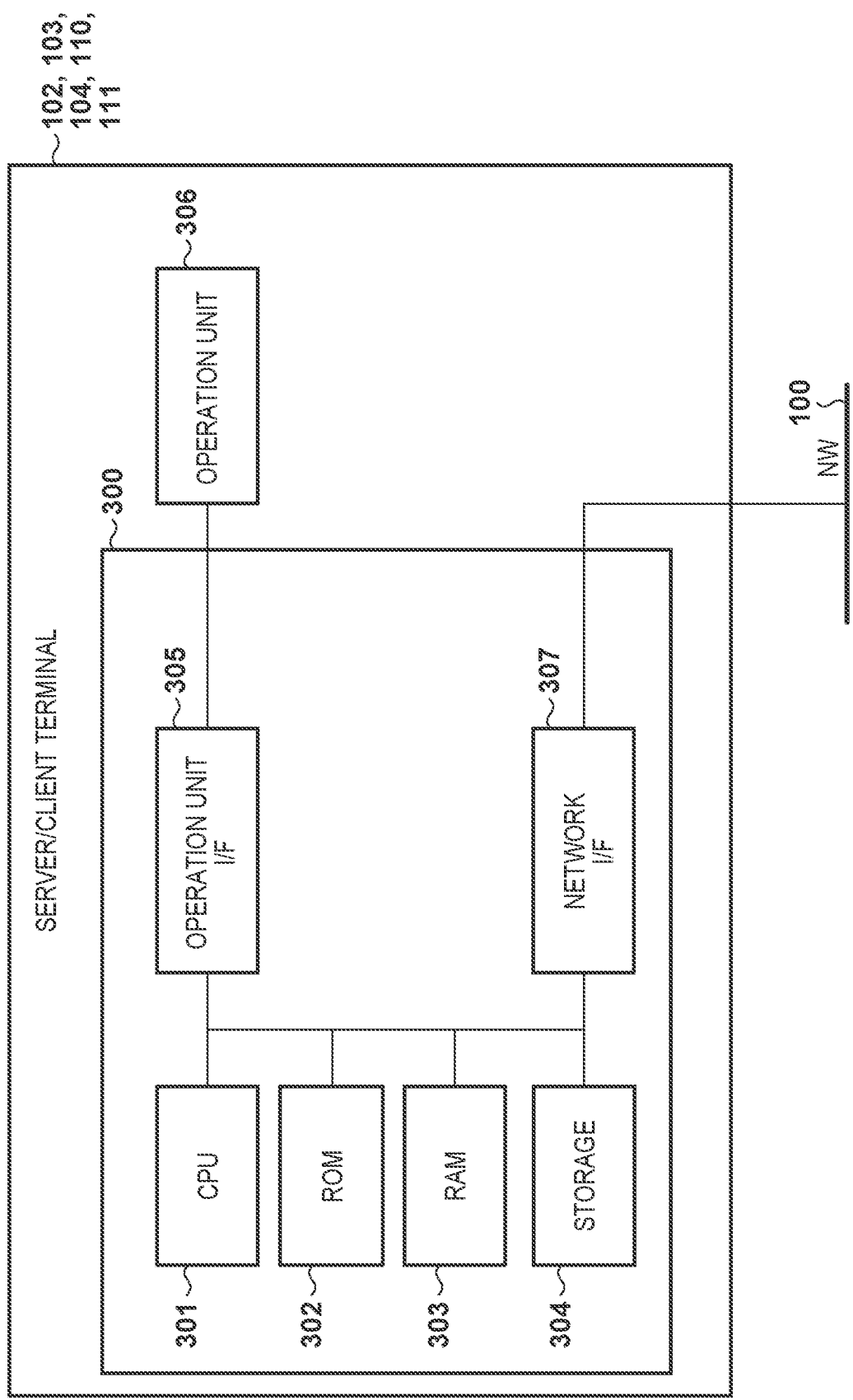
FIG. 3 is a diagram illustrating an example of a hardware configuration of a server and a client terminal according to the present embodiment.

FIG. 3 is a block diagram illustrating a hardware configuration of computers that are actual resources that provide the first CPS 102, the second CPS 103, the application management service 110, the online support service 111, and the client terminal 104, which are described in FIG. 1. In the following, a server that provides the first CPS 102 is referred to as a server 102, and a server that provides the second CPS 103 is referred to as a server 103. Similarly, a server that provides the application management service 110 is referred to as a server 110, and a server that provides the online support service 111 is referred to as a server 111.

A CPU 301 controls the operation of the server by cooperating with each of the units. The CPU 301 reads and executes an operating system (OS) and control programs that are stored in a ROM 302 or a storage 304. The ROM 302 stores control programs that can be executed by the CPU 301. A RAM 303 is a main storage memory of the CPU 301 and is used as a work area or a temporary storage region for loading various kinds of control programs. The storage 304 stores print data, image data, various kinds of programs, and various kinds of setting information. In the present embodiment, an auxiliary storage device, such as a hard disk drive (HDD), is assumed as the storage 304; however, a non-volatile memory, such as a solid-state drive (SSD), may be employed in place of the HDD. The storage 304 of the online support service stores an extension setup information file, which is a file in which information for extending the functions provided by the client terminal 104 is described. Hardware, such as the CPU 301, the ROM 302, and the RAM 303, thus constitutes a so-called computer.

The server 102 and the server 103 may further include application-specific integrated circuits (ASIC) that render print data and the like. For the sake of explanation, in the present embodiment, a case where one CPU 301 executes each of the processes, which are illustrated in the sequences to be described later, using one memory (e.g., RAM 303) will be illustrated; however, another mode may be employed. For example, each of the processes, which are illustrated in the flowcharts to be described later may be executed by cooperation of a plurality of processors, RAMs, ROMs, and storage. Each of the processes may be executed using a plurality of server computers. By using containerization and virtualization technology, the server 102, the server 103, the server 110, and the server 111 can provide cloud print services to a plurality of different tenants.

A network I/F 301 is an interface for performing network communication with the outside. The server 102 and the server 103 are connected to the Internet via the network I/Fs. An operation unit I/F 305 is an interface to which the control unit 136, such as a keyboard, a mouse, and a display, are connected. Each of the input/output devices that are connected to the I/Fs are used, for example, to maintain actual servers that provide cloud print services. Since the hardware configuration of the client terminal 104 is similar to that of the server 102, the description will be omitted.

The first CPS 102, which is provided by resources of the server 102, includes a function for registering and managing output destination printers, a function for managing the state of progress of a print job, and a function for spooling print jobs. The first CPS 102 stores output destination printer information for managing output destination printers. The output destination printer information includes attribute information, which indicates the capability of the printing apparatus; information for communicating with the printer (such as an IP address, the host name of the printer, and an access token that is necessary for communication); and management information to which information that identifies the name of the model of the printing apparatus is associated. The management information is referenced as appropriate in a sequence to be described below.

Windows®, Android®, macOS®, iOS®, or the like are installed on the client terminal 104. The user can use a print client and a print framework for the first CPS 102 that is pre-installed on the OS. The print client and the print framework provide the user with, for example, printer search and registration processing, print setting screen display processing, print data generation processing, a process for communicating with the first CPS 102, and a status monitor function for monitoring the progress of printing. The process for communicating with the first CPS 102 includes transmitting a print job, a print data file, and the like to the first CPS 102. In the present embodiment, a case where a general-purpose printer driver or a print client is pre-installed has been illustrated; however, the present invention is not limited thereto. For example, a configuration may be taken such that the user installs the print client later. As described in FIG. 9 and the like, in the present embodiment, the general-purpose printer driver does not communicate directly with the first CPS 102 but communicates via the print setting extension application 1042. That is, in the present embodiment, the print setting extension application 1042 corresponds to a print client that conforms to the Internet Printing Protocol (IPP).

<Printer Registration Sequence in First Embodiment>

Figure 4:
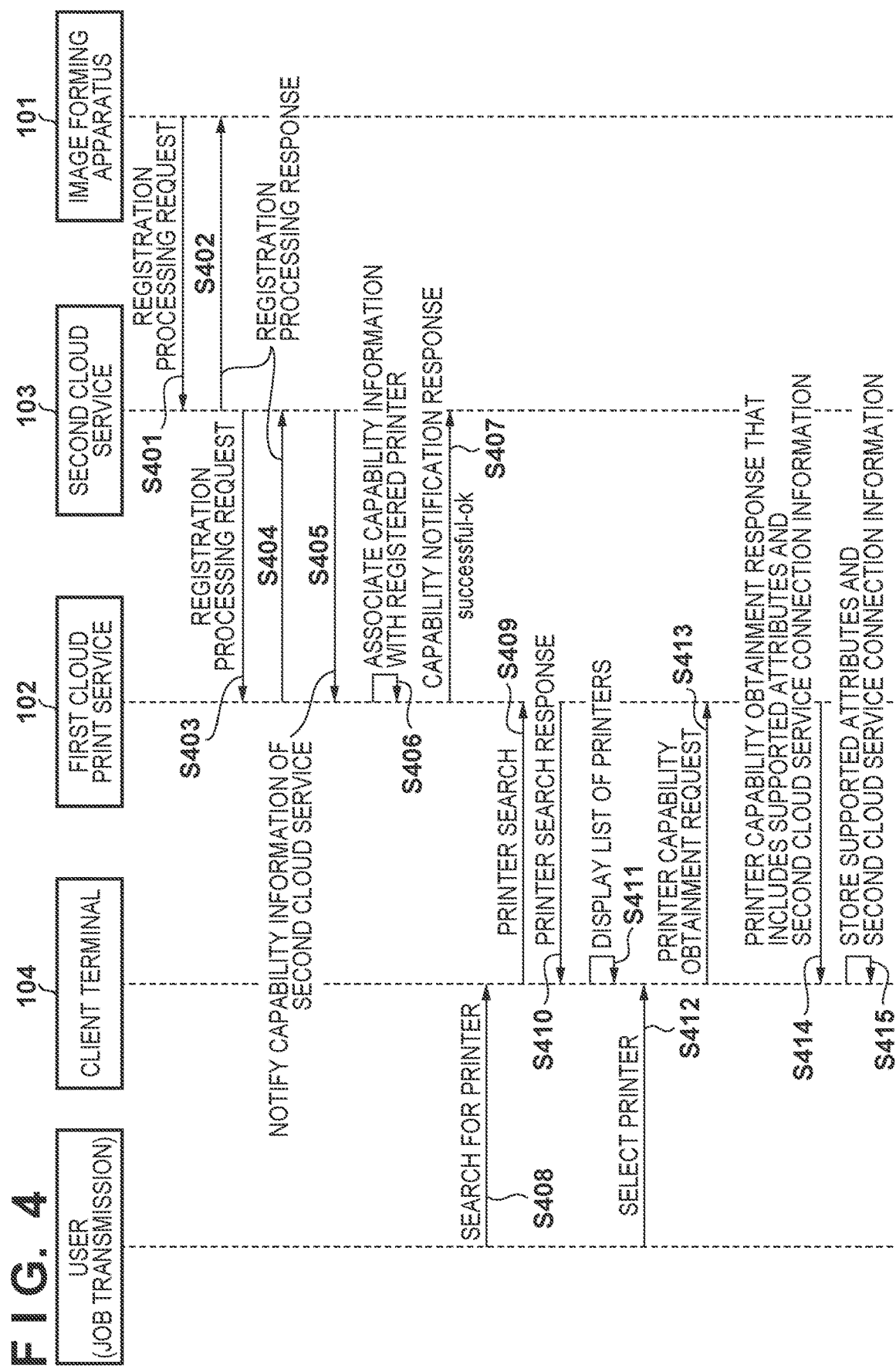
FIG. 4 is a sequence diagram illustrating an example of a process for registering a printer and registering a cloud print service as a virtual printer according to the present embodiment.
Figure 5:
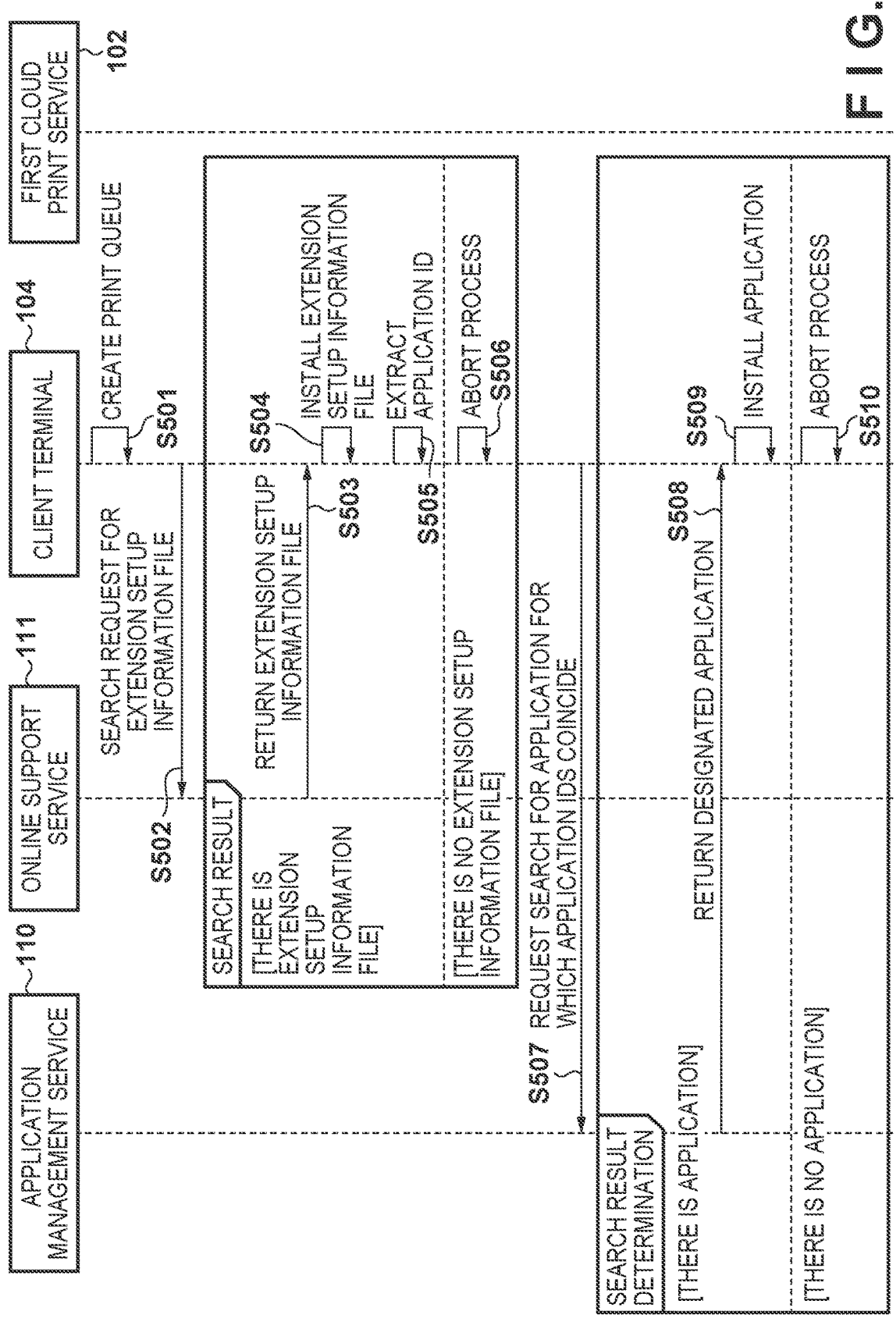
FIG. 5 is a sequence diagram illustrating an example of a process for installing a print setting extension application according to the present embodiment.

Next, a process for registering a server as a virtual printer in the first CPS 102 and registering a printer in the second CPS 103 according to the first embodiment will be described with reference to FIG. 4. This process may be performed at the time of installation of a printer driver or may be performed using a preinstalled printer driver.

First, the user, such as an administrator, issues an instruction to register in the second CPS 103, which is the registration destination, using the operation unit 216 and the like of the image forming apparatus 101, such as the printing apparatus. In step S401, upon receiving the instruction, the printing apparatus 101 makes a registration processing request to the second CPS 103, which is the registration destination. In step S402, upon receiving the registration processing request, the second CPS 103 performs a procedure for registering the image forming apparatus 101 as well as printer registration processing and returns a registration processing response to the image forming apparatus 101. Next, the user, such as an administrator of the second CPS, registers the second CPS 103 to the first CPS as a virtual printer. One of the reasons for registering the second CPS 103 as a virtual printer is for the second CPS 103 to receive a print job that the general-purpose printer driver has transmitted to the first CPS 102 and manage the print job. The second CPS also includes a print job storage function, and the stored print jobs are held for a certain period of time in the storage 304 of the second CPS 103 until a print instruction is received from the image forming apparatus 101, which has been registered in the second CPS 103 in step S401. The second CPS 103 includes a function that can perform printing not only from the image forming apparatus 101 but from any registered printing apparatus so long as certain conditions are satisfied, that is, a so-called print anywhere function.

Figure 6:
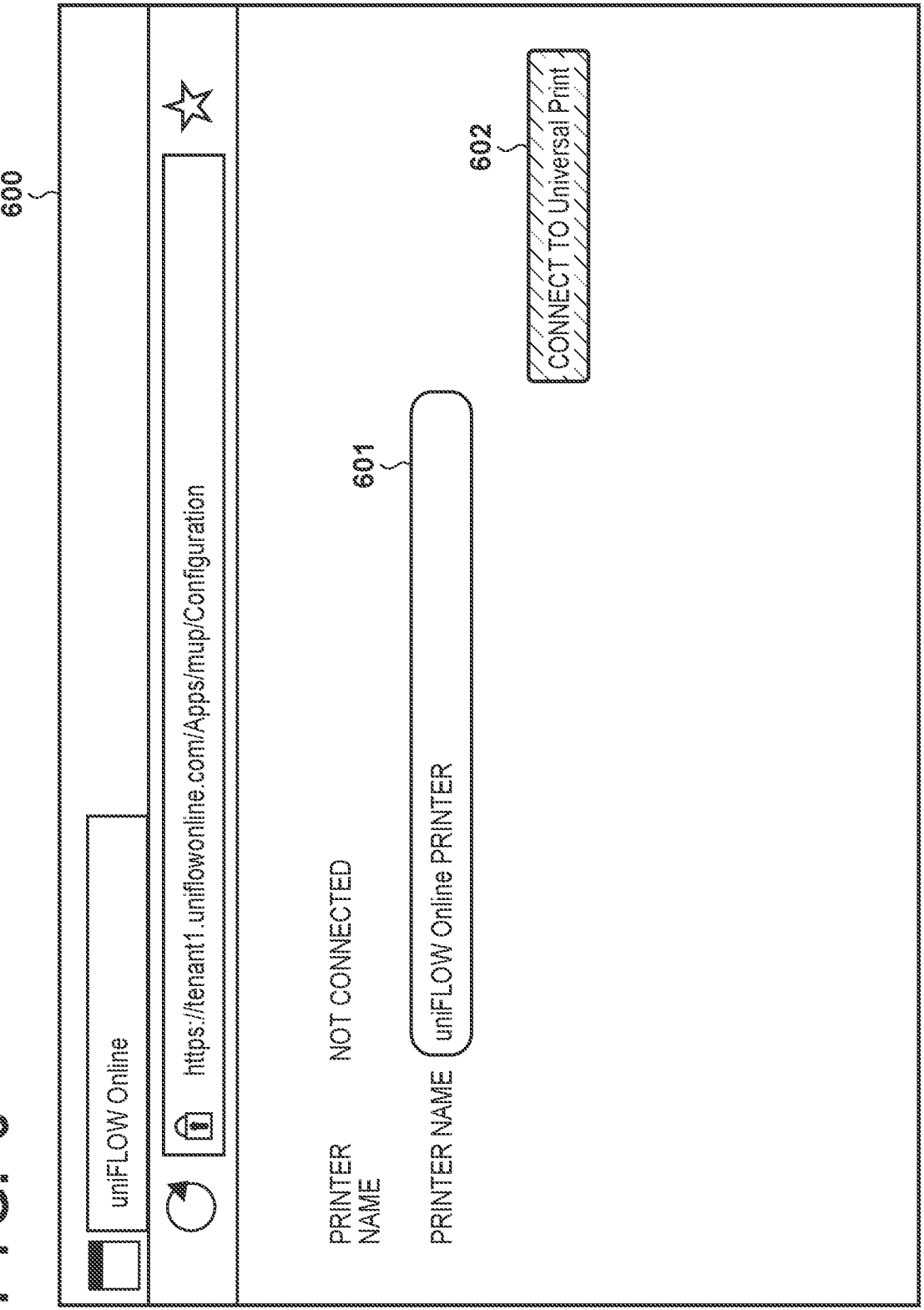
FIG. 6 is a diagram illustrating an example of a screen for registering a second cloud print service in a first cloud print service in the present embodiment.

The process of registering the second CPS 103 as a virtual printer in the first CPS 102 will be described with reference to FIG. 6. FIG. 6 is a diagram in which a tenant website of the second CPS 103 is displayed on a web browser of a client, such as the client terminal 104. However, the configuration screen is one example, and the present invention is not limited thereto. The user, such as an administrator, inputs the name of a printer to register in the first CPS 102 in a printer name 601 of a tenant website screen 600 of the second CPS 103. Having inputted the name, the user presses a "connect to universal print" button 602.

Upon detecting the press of the button 602, in step S403, the second CPS 103 transmits a registration processing request to the first CPS 102. It is assumed that the protocol for registration processing conforms to a protocol that is defined in the first CPS 102. Here, description will be given assuming that Register-Output-Device operation, which is defined in PWG 5100.22, is used one example. Upon receiving the registration processing request, the first CPS 102 confirms the contents of the registration request and, in step S404, transmits a registration processing request response to the second CPS 103. In step S404, if there is no problem in the contents of the registration processing request, a successful response will be made, and if there is a problem, a failure response will be made. In the present embodiment, description will be given assuming that a successful response has been made. Information of an output destination printer is registered in the first CPS 102 by the process of steps S403 and S404. However, this output destination printer is a virtual printer of the second CPS 103. The virtual printer of the second CPS 103 is an instance for which the second CPS 103, for example, has been virtualized as a printer and can be treated as a printer on the print-job-inputting side (e.g., the first CPS 102). In the registration processing, an access token for accessing the first CPS 102 from the second CPS 103 is issued by the first CPS 102. The second CPS 103 stores that access token in the storage 304 and uses it when accessing the first CPS 102 to query or make requests to the first CPS 102.

Next, in step S405, the second CPS 103 transmits a capability notification, which includes its connection information, to the first CPS 102. In the present embodiment, a case where Update-Output-Device-Attributes operation, which is defined in PWG 5100.18, or the like is used is assumed. In the process of step S405, a capability registration packet, which is indicated in FIG. 7A and describes capability information, for example, is transmitted as connection information. The capability registration packet of FIG. 7A includes IPP compliant standard attribute information and vendor-specific attribute information. Next, upon receiving the capability information from the second CPS 103, in step S406, the first CPS 102 registers not only attribute information that it supports but also attribute information that it does not support as output destination printer information in association with a registration target printer. The supported attribute information and unsupported attribute information are stored separately. The unsupported attribute information includes, specifically, a tenant website URL (ufo-tenant-url: https://tenant1.uniflowonline.com), which is connection information of the second CPS 103.

In step S407, the first CPS 102 transmits a registration successful response "Success-ok", which is illustrated in FIG. 7C, to the second CPS 103. A status message is added to the information as supplementary information. The status message includes information that indicates some attributes not being supported by the cloud print service but unsupported attributes having been registered. This registration processing makes it possible to perform a process for registering attributes that are not supported by the first CPS 102, specifically, connection information of the second CPS 103 (e.g., tenant website URL). It also becomes possible to automatically obtain, from the print setting extension application 1042, print management functions for when cloud coordination is performed.

Upon having registered the virtual printer of the second CPS 103 to the first CPS 102, the operation will be on the client terminal 104 side next. In step S408, the user executes a search for a printer of the first CPS 102 from the operation unit 306 of the client terminal 104. Upon detecting a printer search instruction from the user, in step S409, the client terminal 104 transmits a printer search request to the first CPS 102. The search request includes cloud account information that corresponds to the user that is logged in to the client terminal. The cloud account information is used to identify the tenant to which the user belongs. The printer search may be performed with a method in which a search is performed by designating all of the printers that are registered in the first CPS 102 and are managed by the tenant to which the user belongs or a method in which a search is performed using a filter condition according to a specific printer name, location, or the like.

In step S410, upon receiving the search request from the client terminal 104, the first CPS 102 transmits information of printers that are registered in the first CPS 102 and coincide the search request to the client terminal 104. At this point in time, there is no need to make a response including specification information that is associated with the printer, and representative attribute information, such as the printer name, which is necessary for output destination selection, need only be returned. Upon receiving printer list information from the first CPS 102, in step S411, the client terminal 104 displays a list of printers on the operation unit 306. The client terminal 104 may search for printers on the local network using a search protocol, such as mDNS, and merge the search results and display the results on a printer list screen. It is assumed that the screen also displays output destination printers that are already registered in the print framework of the client terminal 104 in a list.

In step S412, the user selects a desired printer from the list of printers. Here, a case where a printer that is registered in the first CPS 102 but not registered in the client terminal 104 is selected will be described. Upon detecting a printer selection, in step S413, the client terminal 104 transmits a printer capability obtainment request to the first CPS 102 to obtain a more detailed specification of a corresponding printer. In the present embodiment, Get-Printer-Attributes operation of IPP, for example, is assumed for the printer capability obtainment request.

Upon receiving the printer capability obtainment request, in step S414, the first CPS 102 transmits a printer capability obtainment response, which includes attributes that are supported or unsupported by the first CPS 102, to the client terminal 104. In the process of step S414, a capability obtainment response packet, which is indicated in FIG. 7B and contains capability information, is transmitted, for example. The packet of FIG. 7B contains a string of the connection information of the second CPS 103 that has been registered in the first CPS 102 in step S405. As indicated in FIG. 7B, it is possible to perform notification including attributes that are unsupported by the first CPS 102 but are supported by the second CPS 103. Regarding the attributes that are unsupported by the first CPS 102, cloud service connection information of the second CPS 103, such as a tenant URL, is included. Next, in step S415, the client terminal 104 stores the supported attributes and unsupported attributes, such as the cloud service connection information of the second CPS 103.

<Installation of Print Setting Extension Application>

Next, installation of the print setting extension application (also referred to as extension application) 1042, which is performed when the user performs on the client terminal 104 a setup operation for performing printing on the image forming apparatus 101, will be described. This process starts immediately after registration of the image forming apparatus 101 by a setup operation of the general-purpose printer driver 1041 for the image forming apparatus 101, which is the process of FIG. 4, being performed on the client terminal 104 and creation of a print queue (step S501).

First, the client terminal 104 performs additional identification information appending processing on device identification information. This is a necessary process for when obtaining an extension setup information file 800, which is indicated in FIG. 8, from the online support service 111, and additional identification information need only be a string that is different from a typical device identification information. In the case of the present embodiment, additional identification information ("PrinterApp_"), which indicates that an application corresponds to that of the printer, is appended to device identification information to distinguish an application of a search target from applications of other devices. "PrinterApp_" is only an example and may be another string or numeral or symbol. As a result of the above process, in the case where the device identification information of the image forming apparatus 101 is device001, for example, the device identification information becomes PrinterApp_device001 after the additional identification information appending processing.

In step S502, the client terminal 104 transmits a search request for extension setup information file 800, which includes target device identification information to which additional information has been appended, to a service that is on the network, such as the online support service 111. The online support service 111 is notified of the device identification information, "PrinterApp_device001", to which additional identification information has been appended, according to step S502. The extension setup information file 800, which is indicated in FIG. 8, is stored in the online support service 111.

FIG. 8 is an example of the extension setup information file 800. An extension setup information file is a file that has been created by the vendor of the image forming apparatus 101 and registered in the online support service 111. In the extension setup information file 800, an application identifier for identifying a print setting extension application that is used for settings for print data to be transmitted to the image forming apparatus 101 is described. In the extension setup information file that is indicated in FIG. 8, an item, "PackageFamilyName", is identification information 801 of the print setting extension application. Meanwhile, in "PrinterHardwareId", device identification information 802 of the image forming apparatus 101 to which additional identification information has been appended is described. In addition to the extension setup information file 800 in which the identification information 801 of the print setting extension application is described, an extension setup information file in which the identification information of the printer driver is described is stored in the online support service 111.

The extension setup information file in which the identification information of the printer driver is described has a configuration similar to that of the extension setup information file 800 in which the identification information 801 of the print setting extension application is described; however, there are items with different values. For example, in the extension setup information file in which the identification information of the printer driver is described, the identification information of the printer driver is described in association with the field of "PackageFamilyName". In addition, in "PrinterHardwareId" of the extension setup information file in which the identification information of the printer driver is described, device identification information for which additional identification information has not been described is described.

As described above, both the extension setup information file in which the identification information of the printer driver is described and the extension setup information file in which the identification information of the print setting application is described are stored in the online support service 111. Therefore, the client terminal 104 appends additional identification information to the device identification information to obtain a necessary extension setup information file as appropriate. Upon receiving a search request, the online support service 111 identifies an extension setup information file for which the device identification information that is specified in the request coincides with the value of "PackageFamilyName" in the file. For example, if device identification information to which additional identification information has been appended is specified, the extension setup information file 800 in which the identification information 801 of the print setting extension application is described will be identified. If device identification information to which additional identification information has not been appended is specified, the extension setup information file in which the identification information of the printer driver is described will be identified. The extension setup information file thus identified will be a target of a search.

As a result of the search, if the online support service 111 stores the extension setup information file 800 that includes the target device identification information, in step S503, the online support service 111 returns the extension setup information file 800 to the client terminal 104. At this time, the contents of the extension setup information file 800 are written in the registry of the client terminal 104.

Next, in step S504, the extension setup information that is described in the extension setup information file 800 that has been obtained from the online support service 111 is installed in association with the print queue that has been generated in step S501. Next, the application ID is extracted from the extension setup information that has been installed in step S505. The application ID is the identification information 801 that has been defined in "PackageFamilyName" in the extension setup information file 800. The process up to this point is the process for when an extension setup file that corresponds to the image forming apparatus 101 is stored in the online support service 111.

As a result of the search, there may be cases where the online support service 111 cannot detect the extension setup information file 800 that includes the target device identification information. At this time, in step S503, it is returned that there is no corresponding extension setup information file. Upon that response, in step S506, the client terminal 104 completes the cloud print driver setup and aborts the process for installing the application (print setting extension application 1042). If an extension setup file could not be received within a predetermined time from the search request of step S502 or if an error notification is received from the online support service 111, the client terminal 104 executes the process that is described in step S506.

From step S507 onward, a process for when the extension setup file has been obtained and the application ID has been extracted therefrom will be described. In step S507, the client terminal 104 requests the application management service 110 to search for an application for which the extracted application ID coincides. An application and an application ID are registered in the application management service 110 by the vendor that provides the image forming apparatus 101. The application management service 110 stores an application that runs on the client terminal 104 in association with an application ID that is identification information of the application.

If the application management service 110 holds a print setting extension application for which the requested application ID coincides, in step S508, the application management service 110 returns the specified print setting extension application 1042 to the client terminal 104. Here, the print setting extension application 1042 to be returned is an application to which the same ID as that of the transmitted application ID has been given.

In step S509, the client terminal 104 installs the obtained print setting extension application 1042 in association with the client-side print queue. The client terminal 104 stores the application ID as print queue information in the registry. The print setting extension application 1042 sets the client terminal 104 such that the print queue that is associated with the application notifies an event at a timing that has been set in the print setting screen. The installed print setting extension application 1042 is started after the client terminal 104 is powered on and started up and operates as a background task after the startup.

Meanwhile, if the application management service 110 does not hold a print setting extension application for which the requested application ID coincides, in step S510, the client terminal 104 aborts the process for installing the application. In such a case, the process ends with the general-purpose printer driver 1041 being installed in association with the generated print queue and without the print setting extension application 1042 not being associated with the print queue. In such a case, cloud printing is possible if the general-purpose printer driver 1041 conforms to IPP; however, the print management functions according to the second CPS103 cannot be used. In the above description, a predetermined character string is appended to the device identification information of the image forming apparatus 101 to search for the extension setup file. If files for installing the printer driver can be distinguished, a configuration may be taken so as to perform a search without appending a predetermined character string.

<Printing Sequence According to First Embodiment>

Next, a sequence for performing printing from the client terminal 104 via the first CPS 102 and the second CPS 103 according to the first embodiment will be described with reference to FIG. 9. A process for the sequence for performing printing from a client terminal (e.g., the client terminal 104) via the first CPS 102 and the second CPS 103 according to the first embodiment will be described with reference to FIG. 9.

In step S901, the user starts printing by pressing a print button on the application. Upon detecting the press of the print button, in step S902, the general-purpose printer driver 1041 of the client terminal 104 generates a print job. Having generated a print job, in step S903, the general-purpose printer driver 1041 of the client terminal 104 transmits that print job to the print setting extension application 1042. At that time, the print job includes attribute information, which indicates print settings, and the above-described tenant website URL, which is connection information of the second CPS 103. The print setting extension application 1042 is an application that is associated with the image forming apparatus 101 for which the print queue has been created in step S501. Therefore, a configuration may be taken so as to, when the image forming apparatus 101 is selected and a print instruction is issued, and transmit the print job to the print setting extension application 1042 instead of the image forming apparatus 101. In such a case, the print queue that corresponds to the image forming apparatus 101 may be replaced with a print queue that corresponds to the print setting extension application 1042.

Upon receiving the print job, in step S904, the print setting extension application 1042 requests the second CPS 103 for print management function information, using a URL that is the connection information of the second CPS 103. The print management function information is, specifically, management information that is related to printing to be performed by a print eligible user and, specifically, includes at least one of cost bearer department information, print limitation information, and print budget information held by the user. Here, a cost bearer refers to the bearer of the cost. Here, cost bearer department information will be described as one example; however, the print management function information is not limited thereto. The print management function information is not limited to these kinds of information and may include, for example, the amount of printing (e.g., the number of pages) for each department or user; statistical information related to frequency or the like; and security management information, such as ID of a user that executed a restricted secure job. Of course, other kinds of information that are managed in the second CPS 103 may be included. It is assumed that authorization has been granted in advance by the second CPS 103 and the access token is stored in the print setting extension application 1042; however, if the access token is not stored, authentication processing for obtaining an access token may be performed here.

Upon receiving the request for print management function information, in step S905, the second CPS 103 returns information that is related to the print management functions for the user information of the request source. Here, a list of printing cost bearer departments to which the user belongs is returned. Upon receiving the information related to the print management functions, in step S906, the print setting extension application 1042 performs print management processing. Here, the received list of the printing cost bearer department to which the user of the client terminal 104 belongs is displayed in a list on the operation unit 306 of the client terminal 104.

FIG. 10 is an example of a screen for listing printing cost bearer departments to which the user actually belongs and for allowing the user to make a selection therefrom. In a cost bearer selection screen 1000, there are a button 1001 for a first development department of the development headquarters, a button 1002 for a human resources department, and a button 1003 for personal use. In other words, for this user, the first development department of the development headquarters bears the cost when printing is performed for work operations and the human resources department bears the cost when printing is performed for human-resource-related documents to be submitted. The individual bears the cost for other, personal use. Upon detecting that one of the buttons is pressed, the print setting extension application 1042 adds the identification information of the cost bearer to the print job. When a cancel button 1004 of the cost bearer selection screen 1000 is pressed, the print processing is aborted.

When the print management processing is completed, in step S907, the print setting extension application 1042 transmits a print request that includes attribute information, which indicates print settings, to the first CPS 102. In the present embodiment, Create-Job operation or Print-Job operation of IPP is assumed for the print request. If an instruction is issued with the Print-Job operation, attribute information and print data will be transmitted together. If an instruction is issued with the Create-Job operation, a plurality of pieces of document data will be registered as printing targets, using an operation for adding subsequent documents to be printed. Next, the first CPS 102 analyzes the print request that has been received from the client terminal 104 in step S907 and stores, in the storage 304, information of the print job for which the print attributes (information that indicate print settings) that are included in the request and document data to be printed have been associated. At the time of storage, a process, such as print data rendering, may be performed in the first CPS 102.

Next, in step S908, the first CPS 102 notifies the second CPS 103 of a print job event, which indicates that a print job has been inputted. For notification, Get-Notification operation of IPP, for example, can be used. Upon detecting that there is a print job in the first CPS 102, in step S909, the second CPS 103 makes a print job obtainment request to the first CPS 102. For the print job obtainment request, Fetch-Job operation of IPP, for example, can be used. Upon receiving the print job obtainment request, in step S910, the first CPS 102 returns the print data and print attribute values (i.e., the print job) that are (is) stored in the storage 304. In step S911, the second CPS 103 stores the received print job in its storage 304.

When a print instruction is received from the user on the operation unit 306 of the image forming apparatus 101, in step S912, the image forming apparatus 101 requests second CPS 103 to obtain a print job. Upon receiving the request from the image forming apparatus 101, in step S913, the second CPS 103 identifies the print job that has been selected by the user and transmits the print job to image forming apparatus 101, which is the request source. In step S914, the image forming apparatus 101 prints an image onto a sheet based on the received print job.

By performing the above-described process, when registering, in the cloud print service, the print management function provisioning cloud service as a virtual printer, it is possible to register connection information that cannot be obtained on the service as the capability information. By doing so, it is possible to provide the print management function provisioning cloud service to the client terminal. This makes it possible to increase usability for printing via the cloud print service.

Second Embodiment

Figure 11:
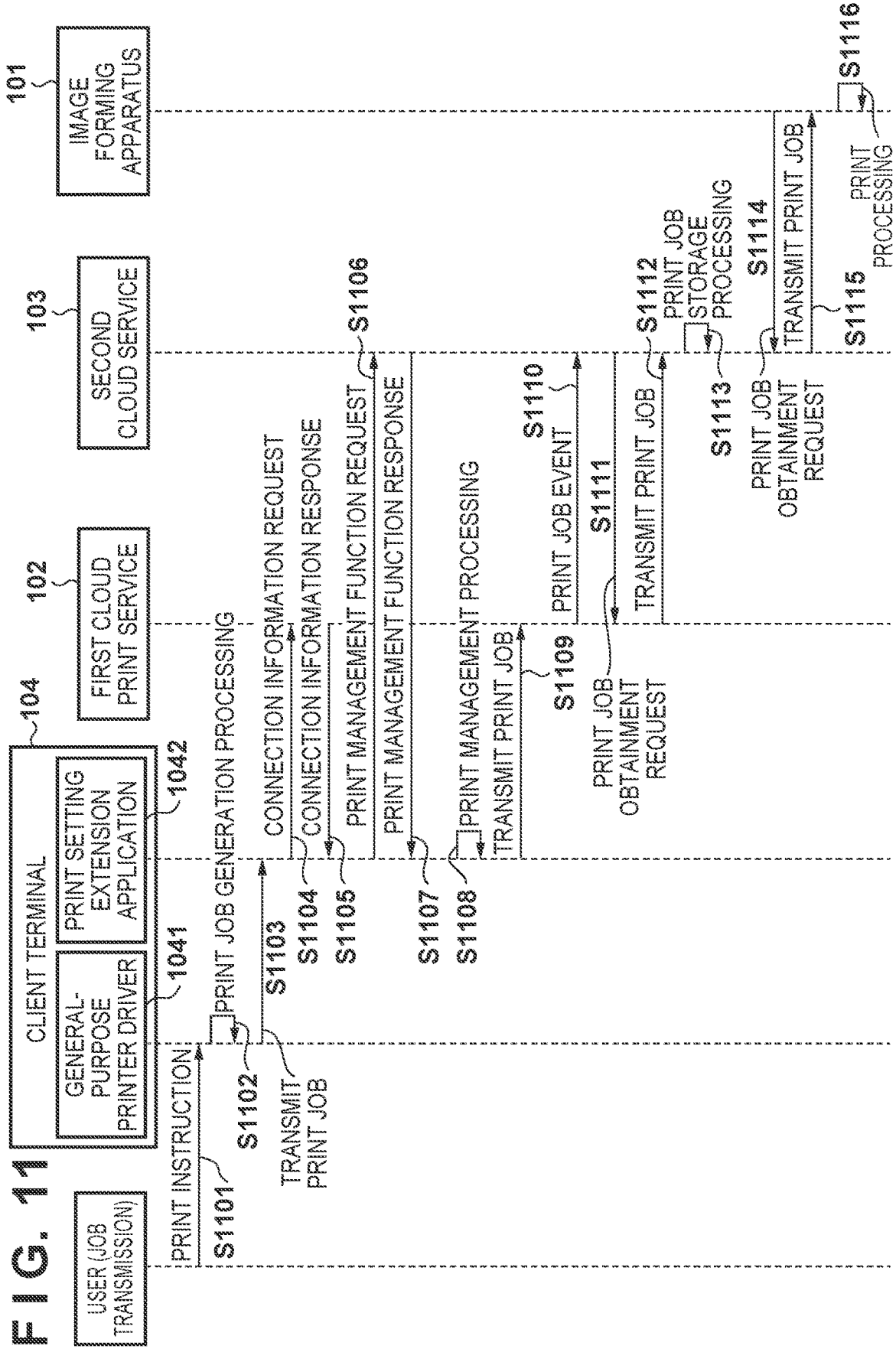
FIG. 11 is a sequence diagram illustrating an example of print processing according to a second embodiment.

In the first embodiment, a method in which the information for connecting to the second CPS 103 is received and held by the first CPS 102 and, at the time of setup of the general-purpose printer driver, is transmitted as extension information of capability information from the first CPS 102 to the client terminal has been described. In this method, the print setting extension application 1042 receives, from the driver, the information for connecting to the second CPS 103 at the time of printing and accesses the second CPS 103. In a second embodiment, a method in which the print setting extension application 1042 performs direct obtainment from the first CPS without going through the general-purpose printer driver 1041 will be described as another method. In the present embodiment, the sequence of FIG. 11 is executed in place of FIG. 9 of the first embodiment. Other configurations and procedure are similar to those of the first embodiment.

The processes of steps S1101 to S1103 are equivalent to the processes of step S901 to S903 of FIG. 9, which have been described in the first embodiment, and so, description will be omitted. However, in step S1103, the general-purpose printer driver 1041 need not transmit the information for connecting to the second CPS 103 to the print setting extension application 1042.

In step S1104, upon receiving the print job, the print setting extension application 1042 requests the first CPS 102 for the connection information of the second CPS 103. This connection information of the second CPS 103 is stored in a specific storage by an administrator that performs registration when the second CPS 103 is registered as a virtual printer in the first CPS 102 in step S405 of FIG. 4, which has been described in the first embodiment. In step S1105, the first CPS 102 transmits the information that is stored in the specific storage to the request source. As a specific example, the connection information of the second CPS 103 is stored in a region in which the location of the image forming apparatus 101 is stored, and the connection information is obtained by the print setting extension application 1042 by reference at the time of printing. The processes of steps S1106 to S1116, which are subsequent to obtainment of the connection information of the second CPS 103 by the print setting extension application 1042, are respectively equivalent to those of steps S904 to S914 of FIG. 9, which have been described in the first embodiment, and thus, description will be omitted.

By performing the above-described processing, the print setting extension application 1042 can obtain the connection information of the second CPS 103 directly from the first CPS 102 without going through the general-purpose printer driver 1041.

Third Embodiment

In the second embodiment, a method in which the print setting extension application 1042 obtains, directly from the first CPS, the information for connecting to the second CPS 103 has been described. In a third embodiment, a recovery method for when the information for connecting to the second CPS 103 could not be obtained from the first CPS in the sequence of the second embodiment will be described with reference to FIG. 12.

Figure 12:
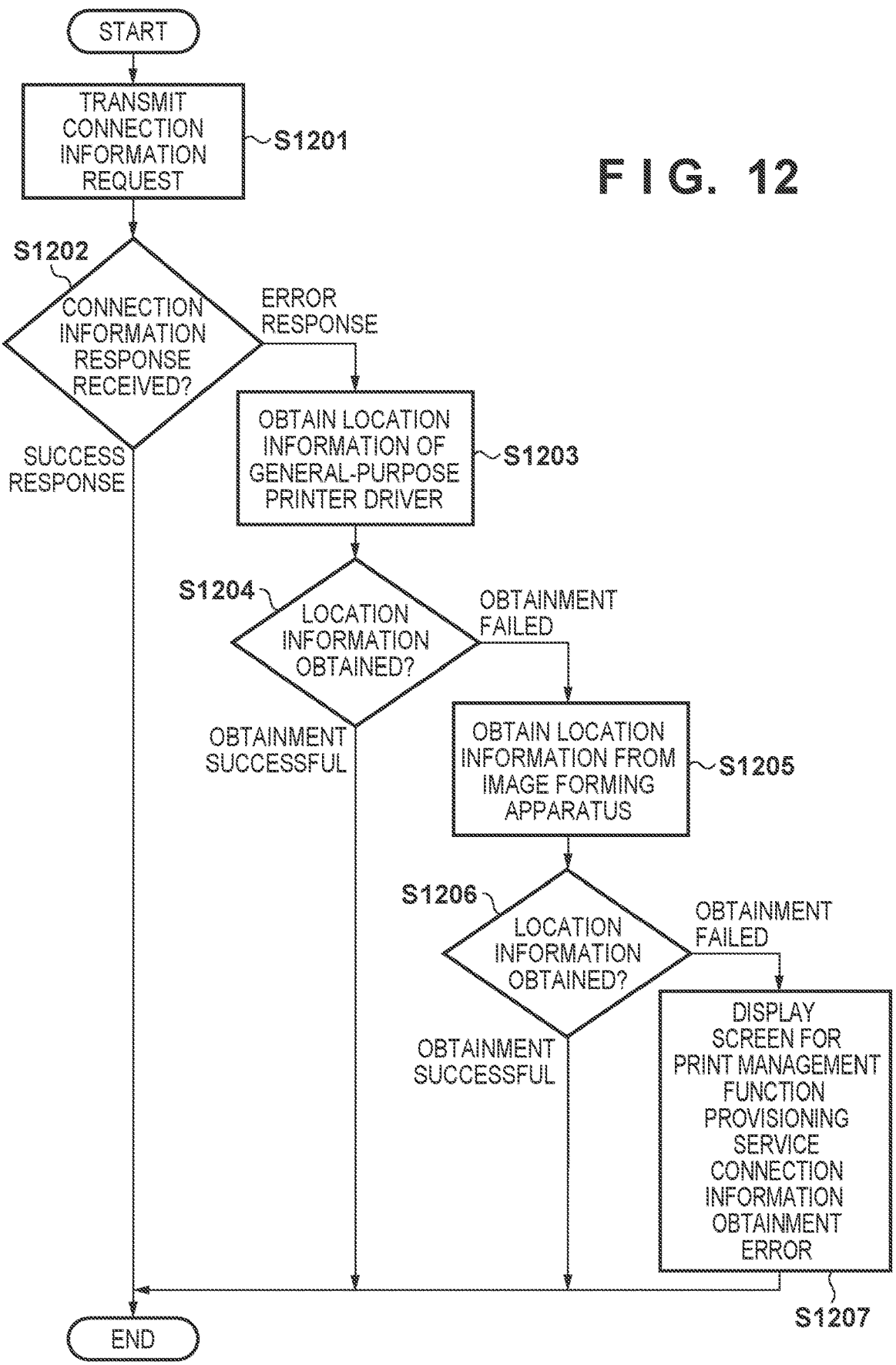
FIG. 12 is a flowchart illustrating an example of print processing according to a third embodiment.

Regarding the object of the present embodiment, the entity that executes the flowchart of FIG. 12 is the print setting extension application 1042, unless otherwise specified. In terms of hardware, it is the client terminal 104 or the CPU 301 thereof. The process that is indicated in FIG. 12 is started by the print setting extension application 1042 requesting the information for connecting to the second CPS 103, which is stored in the specific storage of the first CPS 102, in step S1104 of FIG. 11.

First, in step S1201 of FIG. 12, a request is made for the information for connecting to the second CPS 103, which is stored in the specific storage of the first CPS 102. If the connection information has been properly received in step S1202, connection is made to the second CPS 103 based on that connection information (step S1106).

If it is determined in step S1202 that an error response has been received, a request is made to the general-purpose printer driver 1041 for the information for connecting to the second CPS 103. Specifically, there is a region in which the location information is stored in the general-purpose printer driver 1041. The general-purpose printer driver, during its installation or setup, stores location information that has been obtained from the first CPS 102 or the image forming apparatus 101 to which it is to be connected and includes the information for connecting to the second CPS 103, for example. If it is determined in step S1204 that the information for connecting to the second CPS 103 has been obtained from the location information, connection is made to the second CPS 103 based on that connection information. If it is determined in step S1204 that obtainment of the information for connecting to the second CPS 103 from the location information has failed, in step S1205, two-way communication processing is performed with the image forming apparatus 101 with which connection is to be made, and the information for connecting to the second CPS 103 is obtained from the image forming apparatus 101. The information for connecting to the second CPS 103 is information for connecting to the cloud print service in which the image forming apparatus 101 is registered as a printer. When it is determined in step S1206 that the information has been obtained from the image forming apparatus 101, connection is made to second CPS 103 based on the information for connecting to the second CPS 103. When it is determined in step S1206 that obtainment of information from the location information has failed, in step S1207, a screen for an error in obtainment of connection information of the print management function provisioning service is displayed, and the process is ended. The processes from when connection is made to the second CPS 103 and the print management function request is transmitted (step S1106) to step S1116 are respectively equivalent to those of FIG. 11, and so, description will be omitted.

By performing the above-described processing, even if the information for connecting to the second CPS 103 could not be obtained from the first CPS, the general-purpose printer driver 1041 can obtain the information from the image forming apparatus 101. This makes it possible for the print setting extension application 1042 to obtain the connection information of second CPS 103.

In the case of a portable terminal, such as a tablet or a smartphone, a print client application that functions as a client of a cloud print service may be installed in place of the general-purpose printer driver described in the present embodiment. If a general-purpose printer driver is mentioned in the following description, it may be read as a print client.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-004061, filed Jan. 13, 2023 which is hereby incorporated by reference herein in its entirety.

What is claimed is:

1. A cloud print system in which a print job is transmitted from a client terminal to a second cloud print service via a first cloud print service,
the first cloud print service comprising:
at least one first memory storing at least one first program; and
at least one first processor, wherein the at least one first program causes the at least one first processor to:
when registering the second cloud print service as a printer, obtain connection information for connecting to the second cloud print service and registers the second cloud print service as the printer in association with the connection information, and
in response to a request from the client terminal, transmit the connection information to the client terminal, and
the client terminal comprising:
at least one second memory storing at least one second program; and
at least one second processor, wherein the at least one second program causes the at least one second processor to:
access the second cloud print service based on the connection information and receive a service according to the second cloud print service.

2. The cloud print system according to claim 1, wherein the service according to the second cloud print service includes provision of print management function information.

3. The cloud print system according to claim 2, wherein the print management function information includes at least one of information of a bearer of a cost of a print job, print limitation information, and print budget information.

4. The cloud print system according to claim 1, wherein in the first cloud print service, the at least one first program causes the at least one first processor to, upon receiving a print job from the client terminal, transmit that print job to the second cloud print service registered as the printer.

5. The cloud print system according to claim 4, wherein in the client terminal, the at least one second program causes the at least one second processor to execute a printer driver and an extension application,
the printer driver transmitting a print job to the extension application, and the extension application transmitting the print job to the first cloud print service.

6. The cloud print system according to claim 5, wherein the extension application is associated with an image forming apparatus registered in the client terminal, and the printer driver transmits the print job for the image forming apparatus to the extension application.

7. The cloud print system according to claim 1, wherein
communication between the client terminal and the first cloud print service and between the first cloud print service and the second cloud print service conforms to Internet Printing Protocol.

8. The cloud print system according to claim 1, wherein
an image forming apparatus obtains the print job from the second cloud print service and executes printing.

9. A method of controlling a cloud print system in which a print job is transmitted from a client terminal to a second cloud print service via a first cloud print service, wherein
the first cloud print service
when registering the second cloud print service as a printer, obtains connection information for connecting to the second cloud print service and registers the second cloud print service as the printer in association with the connection information, and
in response to a request from the client terminal, transmits the connection information to the client terminal, and
the client terminal
accesses the second cloud print service based on the connection information and receives a service according to the second cloud print service.

10. An information processing apparatus operable to function as a first cloud print service that holds connection information for connecting to a second cloud print service in a cloud print system in which a print job is transmitted from a client terminal to the second cloud print service via the first cloud print service, the information processing apparatus comprising:
at least one first memory storing at least one first program; and
at least one first processor, wherein the at least one first program causes the at least one first processor to:
when registering the second cloud print service as a printer, obtain connection information for connecting to the second cloud print service and registers the second cloud print service as the printer in association with the connection information, and
in response to a request from the client terminal, transmit the connection information to the client terminal.

11. The information processing apparatus according to claim 10, wherein
the at least one first program causes the at least one first processor to, upon receiving a print job from the client terminal, transmit that print job to the second cloud print service registered as the printer.

12. A non-transitory computer-readable storage medium storing a computer program which, when loaded into a computer and executed, causes the computer to perform an information processing method, wherein
the computer function as a first cloud print service that holds connection information for connecting to a second cloud print service in a cloud print system in which a print job is transmitted from a client terminal to the second cloud print service via the first cloud print service,
the method comprising:
when registering the second cloud print service as a printer, obtaining connection information for connecting to the second cloud print service and registering the second cloud print service as the printer in association with the connection information, and
in response to a request from the client terminal, transmitting the connection information to the client terminal.

* * * * *